No. 718,601. PATENTED JAN. 20, 1903.
F. R. CARPENTER.
PROCESS OF SEPARATING PRECIOUS METALS FROM MATTE.
APPLICATION FILED MAY 21, 1901.
NO MODEL. 2 SHEETS—SHEET 1.
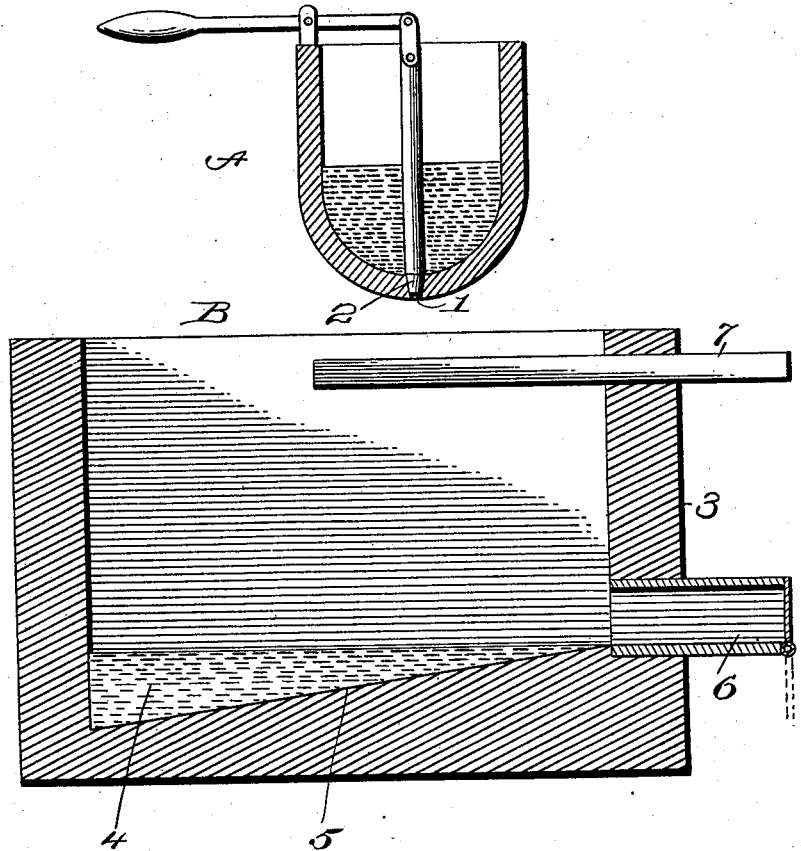

No. 718,601. PATENTED JAN. 20, 1903.
F. R. CARPENTER.
PROCESS OF SEPARATING PRECIOUS METALS FROM MATTE.
APPLICATION FILED MAY 21, 1901.
NO MODEL. 2 SHEETS—SHEET 2.
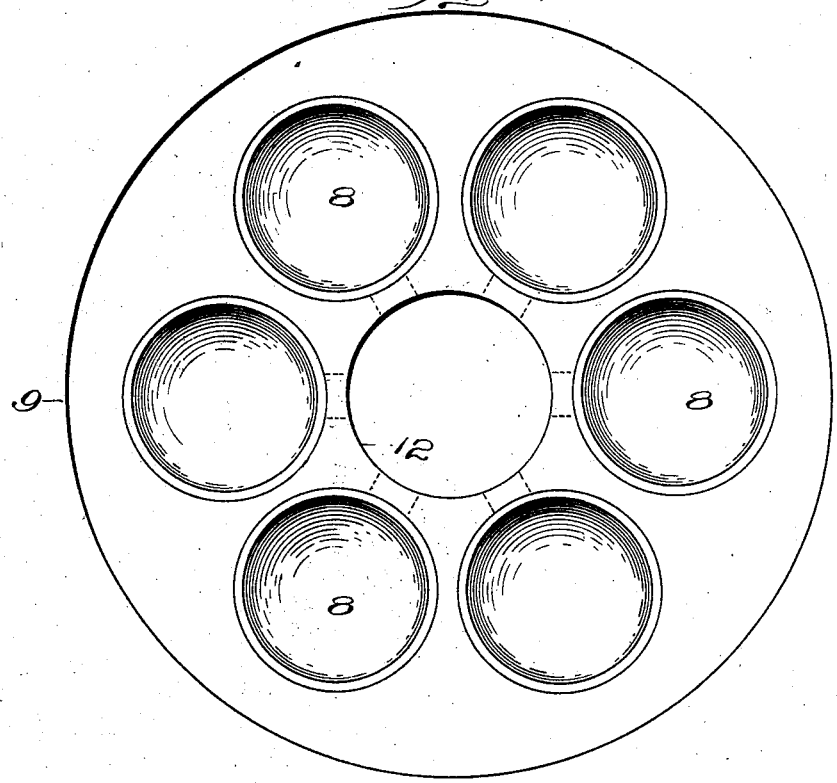
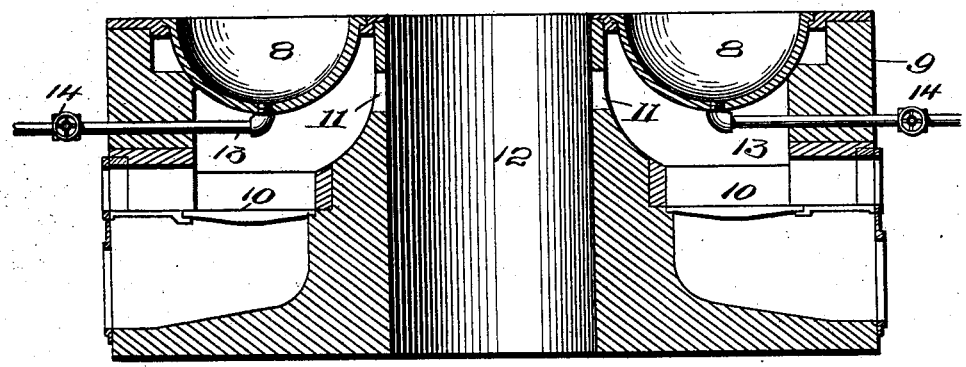

UNITED STATES PATENT OFFICE.

FRANKLIN R. CARPENTER, OF DENVER, COLORADO, ASSIGNOR OF ONE-HALF TO JOSEPH H. BERRY, OF DETROIT, MICHIGAN.

PROCESS OF SEPARATING PRECIOUS METALS FROM MATTE.

SPECIFICATION forming part of Letters Patent No. 718,601, dated January 20, 1903.

Application filed May 21, 1901. Serial No. 61,321. (No specimens.)

*To all whom it may concern:*

Be it known that I, FRANKLIN R. CARPENTER, a citizen of the United States, residing at Denver, in the county of Arapahoe and State of Colorado, have invented certain new and useful Improvements in Processes of Separating Precious Metals from Matte, of which the following is a specification.

My invention relates to processes of separating precious metals from ores, in which the matte produced by smelting and containing the precious metals is treated with lead, which absorbs the precious metals from the matte. It is especially applicable to the refining of matte or regulus containing the precious metals, gold and silver, but mainly gold, and particularly to the refining of matte obtained by pyritic smelting, which is mainly iron matte high in gold and silver and low in copper. As is well understood, in such processes during the leading operation there is a tendency for the absorption of lead by the matte without alloying and removing the precious metals and for the absorption of sulfur and copper by the lead, thereby lessening the commercial value and availability of the lead alloy.

It has heretofore been proposed to subject matte in a crushed condition to a molten-lead bath and at the same time to eliminate the sulfur from the lead through the agency of a body of iron in contact with the lead, but not with the matte. I have discovered that such processes are materially improved by granulating the matte into small but distinct shot-like grains, instead of merely crushing the matte or supplying it to the lead-bath in a pulverized condition. The shot-like grains may be formed, for instance, in the way shot is now made from molten alloy or in the way slag is now granulated. The grains of matte need not be globular, like shot. They may be of irregular shape, but should not be rough or have angles, but should be smooth. A mass of shot-like grains formed in the manner hereinafter described will be free from dust, each grain being distinct and separate from the others. The sizes of the grains may be regulated and maintained more even in size than when it is attempted to produce small pieces by crushing the matte. I have found that when crushed matte is mixed with the lead-bath the dust which is necessarily present forms with the molten lead a mush-like mass, so that it is difficult, if not impossible, to make a clean separation of the two products, and there is consequently loss. This loss is increased by reason of the rough surfaces of the larger particles of crushed matte, which when the separation is attempted tend to carry off mechanically the molten lead. These losses are entirely avoided by the formation of smooth-surfaced shot-like granules before the lead is subjected to the lead-bath. In this process as commonly practiced lead is lost by its uniting with the matte. This can only occur when lead is transformed into a sulfid, as metallic lead will not dissolve in matte. I avoid this loss by preventing the formation of lead sulfid, or, what is the same thing, reducing it as soon as formed. This result I produce by intimately mixing with the matte metallic iron, and as metallic iron and lead sulfid cannot coexist under conditions which permit reactions it necessarily follows that there is no lead sulfid present to be dissolved by the matte. The reaction, which is well known, is as follows:

$$PbS + Fe = Pb + Fes.$$

A further advantage which results from the intimate mixture of metallic iron with the matte is that any silver sulfid or lead sulfid present is at once reduced and the silver thereby rendered more readily soluble in the lead and the reduced lead recovered. The reduction of the silver sulfid would otherwise be effected by the lead.

While I will describe my two improvements as used jointly, it will be obvious that either may be separately employed in carrying out the old process of separating precious metals from matte containing them by molten-lead baths, and the process would be to that extent improved.

In its preferred form I carry out the process as follows: Molten matte, either direct from the smelting-furnace or from a separate melting-furnace, has added to it metallic iron, which it will be found readily dissolves therein and on solidifying does not segregate. The amount of iron to be added will of course differ according to the compositions of the mattes under treatment, but should be sufficient, according to calculations or experiment, to insure in the prepared matte mixture free iron in the amount necessary to prevent any appreciable formation of lead sulfid. By reason of the intimate mixture of the iron with the matte it will be in the best position to prevent any lead or lead sulfid from escaping its action. The mixture thus produced and in its molten state is then granulated in any suitable or desired way. A simple means for this purpose would be to cause a thin stream of the molten mixture to fall on a green wood stick, the spray thus produced being caught in water, from which it can be removed at intervals or continuously, as desired. The product of these operations will be found to be particles or granules having smooth glossy surfaces and having metallic iron uniformly distributed through them. The granules may be as large as one-half inch in diameter, although they are preferably smaller—say one-fourth of an inch in diameter, as that insures a more rapid separation of the precious metals and their solution in the lead. The shape of the particles is also immaterial, the essential point being that they have the smooth uniform surfaces naturally resulting from cooling down small portions of molten material in air or water. The granules if caught in water should be allowed to dry to avoid unnecessary cooling of the lead-bath to which they are subsequently subjected.

For the leading process a bath or baths of molten lead is preferred; but the temperature should not be maintained sufficiently high to melt the matte mixture. To the bath of molten lead the above-described granules of matte mixture are added and thoroughly subjected to the action of the lead, as by rabbling. When the separation of the precious metals from the matte mixtures is deemed sufficient or complete, the granules are allowed to rise to the top of the bath, which they will do by reason of their less specific gravity, and by reason of the absence of dust and their smooth surfaces they are radially raked or skimmed off.

While, as above intimated, one bath might be employed, it will not be found altogether satisfactory to do so. I preferably employ a series of baths, the granules of matte being passed from one to the other in regular order, the fresh granules being applied to the bath of greatest concentration and passing through the baths successively to the freshest bath. When a lead-bath becomes saturated with the precious metals, it is drawn off and treated for their recovery and the granules removed from the last bath. These granules will be found to contain no appreciable amount of lead or precious metals. They may be subjected to any suitable process for the recovery of the desired metallic contents.

In the accompanying drawings I have illustrated some apparatus which may be employed in carrying out my process; but I of course do not wish to be limited to such apparatus.

Figure 1 represents a sectional view of apparatus which may be used for effecting the granulation of the matte mixture. Fig. 2 represents in plan view a convenient form of apparatus for carrying out the leading process; and Fig. 3 represents a section of a portion of the same, some parts being shown in elevation.

In Fig. 1, A represents an ordinary ladle, and B the granulating apparatus. The ladle A, as shown, is provided with an outlet 1, having a stopper 2. The ladle may be supported and carried by a traveling crane or other means not shown in the drawings, but which are well known to those skilled in the art. The granulating apparatus is provided with an upright wall 3 to insure the falling of the particles into the pool of water 4. The bottom 5 is shown as inclined toward the opening 6, through which the granules may be withdrawn by any suitable tools. In the upper portion of the casing formed by the wall 3 is suitably supported the breaking-piece 7, which, as shown, projects inwardly from the wall 3, by which it is supported. The breaking-piece, as shown, is rectangular in cross-section and may be formed of a piece of green wood, which may be replaced as necessary. The ladle filled with the molten matte mixture from any suitable source of supply is arranged in position with its outlet over the breaking-piece 7. The stopper is then raised, permitting a stream of the molten material to flow out and strike against the breaking-piece. This will cause the molten material to scatter in drops, which are caught and solidified in the water below.

The leading apparatus (shown in Figs. 2 and 3) comprises a series of iron kettles 8, arranged in a circle and supported in suitable masonry 9. Each kettle is preferably provided with an independent grate 10, and the products of combustion are carried by separate flues 11 to a common stack 12, which is centrally located. 13 indicates pipes provided with stopcocks 14, connected with the bottoms of the kettles, for drawing off the molten lead when saturated with precious metals.

The operation is as follows: Each kettle is provided with a bath of molten lead prepared and maintained by fire on its respective grate. The granulated matte mixture is supplied to one of the baths and after treatment conveyed from one to another of the baths in turn. The granules continue to be delivered to the first kettle until the lead therein reaches the desired degree of saturation, when delivery of granules to that kettle ceases and the next kettle becomes the initial one, the lead containing the precious metals being drawn off from the first-mentioned kettle and a new bath prepared therein.

As before stated, my process can be carried out with a single lead-bath, although I prefer to use several lead-baths, simultaneously or successively.

Although I have described herein the addition of iron to matte and subsequently leading it, I do not claim this subject-matter broadly herein, as in my application for patent filed September 13, 1902, Serial No. 123,324, I have claimed a process for separating precious metals from matte containing them, which consists in causing an intimate mixture of the matte with metallic iron or dissolving the metallic iron in molten matte and then subjecting the mixture to a bath of molten lead.

I claim as my invention—

1. The process of separating precious metals from matte, which consists in granulating molten matte and then leading it, substantially as described.

2. The process of separating precious metals from matte, which consists in first subdividing the matte into small smooth shot-like grains, and then leading the matte thus prepared.

3. The process of separating precious metals from matte which consists in subdividing the matte into small smooth shot-like grains, and then leading the matte, the leading being maintained at a temperature insufficient to fuse matte but sufficient to cause the absorption of the precious metals from it.

4. The process of separating precious metals from matte, which consists in dissolving iron in the fluid matte, then subdividing the matte containing the iron into small distinct grains, and then leading the matte thus prepared.

In testimony whereof I have hereunto subscribed my name.

FRANKLIN R. CARPENTER.

Witnesses:
 E. REYBOLD, Jr.,
 EDWIN VANCISE.